Nov. 29, 1966 W. M. HANNEMAN 3,288,015
DRILLING AND THREAD FORMING SCREW
Filed June 14, 1965
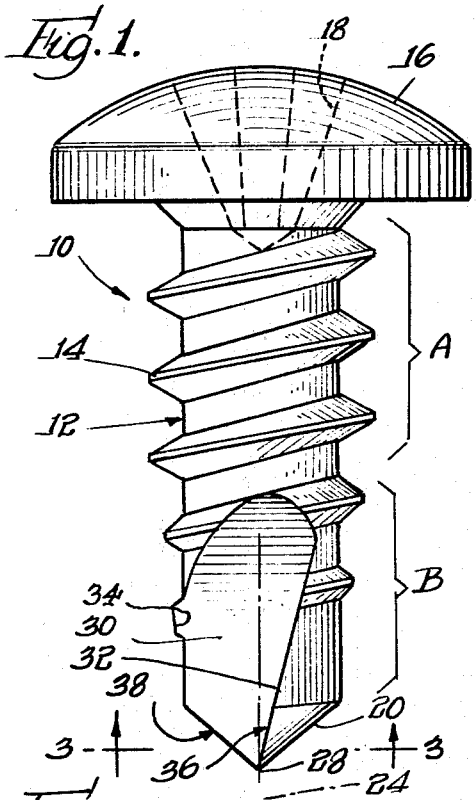
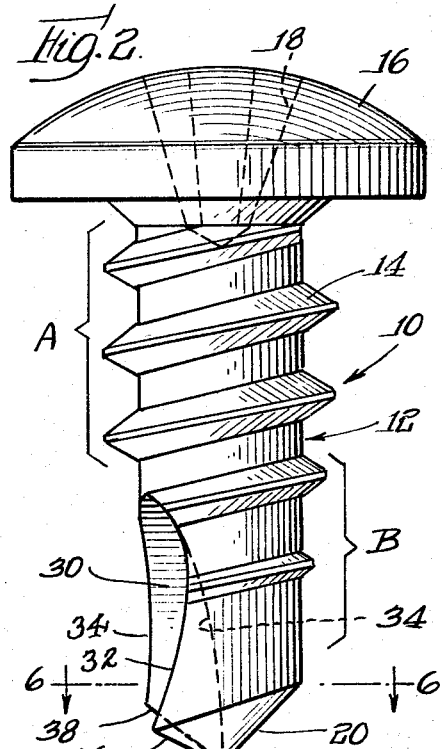
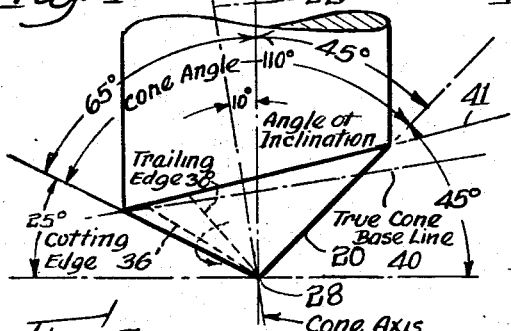
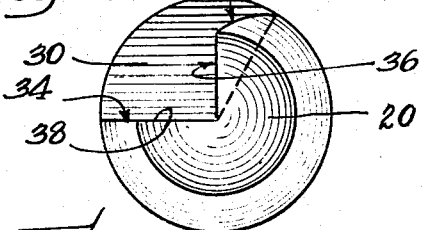
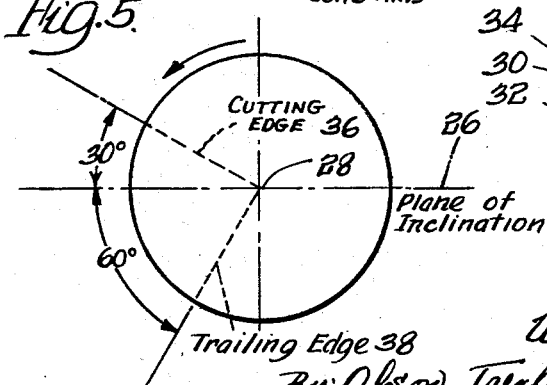
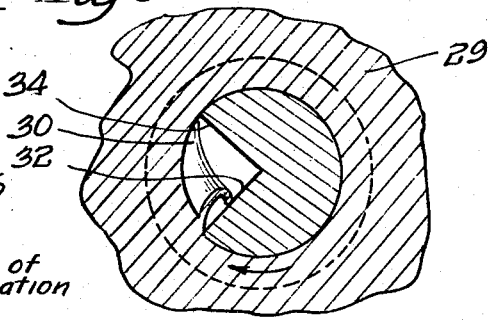
Inventor
Walter M. Hanneman
By: Olson, Trexler, Wolters & Bushnell attys.

United States Patent Office 3,288,015
Patented Nov. 29, 1966

3,288,015
DRILLING AND THREAD FORMING SCREW
Walter M. Hanneman, Annapolis, Md.
(2501 N. Keeler Ave., Chicago, Ill. 60639)
Filed June 14, 1965, Ser. No. 463,726
11 Claims. (Cl. 85—47)

This invention relates generally to screw type fasteners and more particularly to improvements in combined drilling and thread cutting screw fasteners.

One of the important objects of the present invention is to provide a screw fastener of the type referred to above which will function more effectively during the initial drilling and thread cutting operation than conventional screws heretofore available.

In keeping with the above-mentioned object, the present invention contemplates a thread cutting screw fastener which is provided with a novel and efficiently operable drill point at its entering extremity.

More specifically, the present invention envisions a screw fastener of the above referred to type, wherein a slotted drilling tip is so formed as to materially enhance the operative effectiveness of a cutting edge defined by the intersection of the screw slot with the entering extremity of the screw shank.

The foregoing and other objects and advantages will be more apparent from the following detailed description, when considered in connection with the accompanying drawings, wherein:

FIG. 1 is a side elevational view of a combined drilling and thread cutting screw embodying structural features contemplated by the present invention;

FIG. 2 is a side elevational view similar to FIG. 1 taken from the right of FIG. 1;

FIG. 3 is an end view of the screw shank as viewed from the bottom of FIG. 1 along the line 3—3 thereof;

FIG. 4 is a semi-diagrammatic side elevational view of the conical tip of the screw shank shown in FIGS. 1 and 2, more clearly to illustrate the proper location of the longitudinal slot of the screw with respect to the conical tip thereof;

FIG. 5 is a semi-diagrammatic bottom view of the structure as shown in FIG. 4; and FIG. 6 is a transverse horizontal sectional view taken along the line 6—6 of FIG. 2, illustrating the screw actually inserted within a workpiece.

Referring now to the drawing more in detail, wherein like numerals are employed to designate similar parts throughout the various figures, it will be seen that one embodiment of a screw fastener as contemplated by the present invention is designated generally by the numeral 10, FIGS. 1 and 2. The screw 10 consists of a shank 12 provided with thread convolutions 14. The upper extremity of the shank 12 supports a head 16, equipped with means such as a recess 18 for accommodating a conventional screw-turning tool or screwdriver. The thread convolutions 14 include a holding section included within the bracket A, FIGS. 1 and 2, and an entering section indicated by a bracket B.

The thread convolutions on the holding section A are uniform in diameter whereas the entering section included within the bracket B consists of thread convolutions which decrease in diameter and height toward the entering end of the screw shank. Particular attention is directed to the entering tip of the screw shank which includes a conical surface 20. It will be noted in FIG. 4 that the axis of the cone defined by the surface 20, namely the axis designated by the numeral 22, is inclined with respect to the shank axis 24 to the extent of approximately 10 degrees. In FIG. 4 the cone axis 22 is disclosed, whereas in FIG. 5, which is a bottom end view of FIG. 4, the plane of inclination which includes the axis 22 is designated by the numeral 26. Other angular relationships of the cone surfaces with respect to the shank axis 24 are shown clearly in FIG. 4. The apex 28 of the cone surface 20 is coincident with the shank axis 24 although the cone axis is inclined 10 degrees to the left as shown in FIG. 4. This assures proper centering of the screw when it is initially applied to a workpiece 29, FIG. 6.

The entering extremity of the screw shank is provided with a peripheral longitudinally extending recess 30. This recess is bounded on one side by a flat surface 32 and on the other side by a longitudinal curved surface 34. Thus the recess or slot 30 may be formed by applying a circular rotary cutter to the shank axis, the periphery of the cutter determining the curvature of the bounding surface 34 and the side of the cutter determining the flat surface 32. It is preferable to form the recess so that the surface 32 is inclined with the screw axis 24 to the extent illustrated in FIG. 1.

The intersection of the flat bounding surface 32 of the recess 30 with the conical surface 20 presents on entering cutter or drilling edge 36, whereas the intersection of the curved bounding surface 34 of the recess 30 with the conical surface 20 presents a trailing edge 38. By placing the recess 30 as shown in the drawing, the conical surface 20 extending from the cutting edge 36 to the trailing edge 38, provides a surface of relief. In other words, this conical surface of relief extending from the cutting edge 36 toward the trailing edge 38 serves to increase the cutting aggressiveness of the edge 36. It will be apparent that if the axis of the conical surface was coincident with the axis of the screw shank, this surface of relief would not be present. The presence of this surface of relief results from the fact that the axis of the conical surface is inclined with respect to the shank axis and that the recess is properly positioned.

It has been found satisfactory to employ a cone having an included angle of approximately 110 degrees, the axis 22 of which is inclined substantially 10 degrees with respect to the shank axis 24. The distance from the apex 28 to the intersection of the conical surface 20 with the screw shank periphery varies at different locations and is minimum and maximum in the plane of inclination 26. In will be noted that the recess 30 is formed in the area where this distance is minimal. This will be apparent by comparing the cone base or plane indicated by the numeral 40 with the plane 41, defined by intersection with the conical surface 20 with the shank periphery. By so forming the conical surface 20, the above-mentioned relief extending from the cutting edge 36 to the trailing edge 38 is accomplished.

From the foregoing, it will be apparent that as the apex 28 at the entering end of the screw 10 in moved into engagement with a workpiece, contemporaneously the cutting edge 36 is brought into cutting engagement. The increased cutting aggressiveness of the edge 36, resulting from the above-mentioned conical surface of relief, is immediately brought into play. This cutting edge causes an aperture to be drilled in the workpiece with a minimum amount of effort and skill and ultimately the entering convolutions of the thread included within the area designated by the bracket B are brought into thread cutting engagement with the workpiece. The portion of the recess 30 extending above the cutting edge 36 intersects the shank and thread convolutions thereon so as to provide an effective serrated cutting edge. It has been found advisable to so form the recess 30 in the shank body as to result in an inclination of the bounding wall 32 with respect to the shank axis 24 (FIG. 1). By providing this rake in the edge formed along the shank surface, the cutting effectiveness in that vicinity is enhanced. When the drilling and subsequent thread forming operation has been completed the holding portion A of the screw is brought into engagement with the threads previously formed in the workpiece.

From the foregoing, it will be apparent that the present invention contemplates a combined drilling and thread cutting screw fastener which will function more effectively for its intended purpose than known screws of this general type. The provision of the conical entering point having an axis inclined with respect to the shank axis produces a very desirable surface of relief whereby the cutting aggressiveness or effectiveness at the very entering tip of the screw is materially improved. It is of course important to locate the cone apex substantially coincident with the shank axis in order to properly center the screw during its initial application to the workpiece. These features, together with the arrangement and disposition of the longitudinal recess and the bounding surfaces which define said recess cooperate to produce a very efficiently operable screw fastener. The ease and accuracy with which the fastener may be applied to a workpiece is greatly enhanced.

While for purposes of illustration the invention has been described in connection with certain specific structural features, it should be understood that the invention contemplates other modifications coming within the scope of the appended claims.

The invention is claimed as follows:

1. A drilling and thread cutting screw including a shank, a head at one extremity thereof having means for accommodating a screw-turning tool, thread convolutions on said shank presenting a holding section and an entering thread forming section, a conical surface traversing the entering extremity of the shank, the axis of said conical surface being inclined to the shank axis, and the apex thereof being substantially coincident wtih said shank axis and presenting an entering screw tip, the entering portion of said shank having a longitudinal recess, a leading cutting edge, and a non-cutting trailing edge circumferentially spaced therefrom, said edges being defined by the intersection of said recess with said conical surface, said recess being so located with respect to the shank periphery as to present said conical surface as a surface of relief extending circumferentially from said cutting edge to said trailing edge.

2. A drilling and thread cutting screw as set forth in claim 1 wherein the axis of the conical surface is inclined at approximately ten degrees to the shank axis.

3. A drilling and thread cutting screw as set forth in claim 1 in which the conical surface has an included angle of approximately one hundred ten degrees.

4. A drilling and thread cutting screw as set forth in claim 1 wherein the conical surface has an included angle approximating one hundred ten degrees and the axis of said conical surface is inclined at approximately ten degrees to the shank axis.

5. A drilling and thread cutting screw including a shank, a head at one extremity thereof having means for accommodating a screw-turning tool, thread convolutions on said shank presenting a holding section and an entering thread forming section, a conical surface traversing the entering extremity of the shank, the axis of said conical surface being inclined to the shank axis, and the apex thereof being substantially coincident with said shank axis and presenting an entering screw tip, the entering portion of said shank having a longitudinal recess bounded by a longitudinally curved shank wall and a substantially flat wall intersecting therewith, a leading cutting edge, and a non-cutting trailing edge circumferentially spaced therefrom, said cutting edge being defined by the intersection of said flat wall surface of said recess with said conical surface, and said trailing edge being defined by the intersection of said longitudinally curved wall of said recess with said conical surface, said recess being so located with respect to the shank periphery as to present said conical surface as a surface of relief extending circumferentially from said cutting edge to said trailing edge.

6. A drilling and thread cutting screw including a shank, a head at one extremity thereof having means for accommodating a screw-turning tool, thread convolutions on said shank presenting a holding section and an entering thread forming section, a conical surface traversing the entering extremity of the shank, the axis of said conical surface being inclined to the shank axis, and the apex thereof being substantially coincident with said shank axis and presenting an entering screw tip, the entering portion of said shank having a longitudinal recess, a leading cutting edge, and a non-cutting trailing edge circumferentially spaced therefrom, said edges being defined by the intersection of said recess with said conical surface, said recess intersecting said conical surface in the area where the distance from the cone apex to the projected intersection of said conical surface with the shank periphery is minimal, whereby to present a conical surface of relief extending circumferentially from said cutting edge to said trailing edge.

7. A drilling and thread cutting screw including a shank, a head at one extremity thereof having means for accommodating a screw-turning tool, thread convolutions on said shank presenting a holding section and an entering thread forming section, the thread convolutions associated with said entering section decreasing in diameter toward the entering extremity of the shank, a conical surface traversing the entering extremity of the shank, the axis of said conical surface being inclined to the shank axis, and the apex thereof being substantially coincident with said shank axis and presenting an entering screw tip, the entering portion of said shank having a longitudinal recess, a leading cutting edge, and a non-cutting trailing edge circumferentially spaced therefrom, said edges being defined by the intersection of said recess with said conical surface, said recess being so located with respect to the shank periphery as to present said conical surface as a surface of relief extending circumferentially from said cutting edge to said trailing edge.

8. A drilling and thread cutting screw including a shank, a head at one extremity thereof having means for accommodating a screw-turning tool, thread convolutions on said shank presenting a holding section and an entering thread forming section, the thread convolutions of said entering section decreasing in diameter and height toward the entering extremity of the shank, a conical surface traversing the entering extremity of the shank, the axis of the said conical surface being inclined to the shank axis, and the apex thereof being substantially coincident with said shank axis and presenting an entering screw tip, the entering portion of said shank having a longitudinal recess, a leading cutting edge, and a non-cutting trailing edge circumferentially spaced therefrom, said edges being defined by the intersection of said recess with said conical surface, said recess being so located with respect to the shank periphery as to present said conical surface as a surface of relief extending circumferentially from said cutting edge to said trailing edge.

9. A drilling and thread cutting screw including a shank, a head at one extremity thereof having means for accommodating a screw-turning tool, thread convolutions on said shank presenting a holding section and an entering thread forming section, a conical surface traversnig the entering extremity of the shank, the axis of said conical surface being inclined to the shank axis, and the apex thereof being substantially coincident with said shank axis and presenting an entering screw tip, the entering portion of said shank having a longitudinal recess inclined with respect to the shank axis, a leading cutting edge, and a non-cutting trailing edge circumferentially spaced therefrom, said edges being defined by the intersection of said recess with said conical surface, said recess being so located with respect to the shank periphery as to present said conical surface as a surface of relief extending circumferentially from said cutting edge to said trailing edge.

10. A drilling and thread cutting screw including a shank, a head at one extremity thereof having means for accommodating a screw-turning tool, thread convolutions on said shank presenting a holding section and an entering thread forming section, a conical surface traversing the entering extremity of the shank, the axis of said conical surface being inclined to the shank axis and the apex thereof being substantially coincident with said shank axis and presenting an entering screw tip, the entering portion of said shank having a longitudinal recess bounded by a longitudinally curved shank wall and a substantially flat wall intersecting therewith, said substantially flat wall being inclined with respect to the shank axis, a leading cutting edge, and a non-cutting trailing edge circumferentially spaced therefrom, said cutting edge being defined by the intersection of said flat wall surface of said recess with said conical surface, and said trailing edge being defined by the intersection of said longitudinally curved wall of said recess with said conical surface, said recess being so located with respect to the shank periphery as to present said conical surface as a surface of relief extending circumferentially from said cutting edge to said trailing edge.

11. A drilling and thread cutting screw including a shank, a head at one extremity thereof having means for accommodating a screw-turning tool, thread convolutions on said shank presenting a holding section and an entering thread forming section, a conical surface traversing the entering extremity of the shank, the axis of said conical surface being inclined to the shank axis, and the apex thereof being substantially coincident with said shank axis and presenting an entering screw tip, the entering portion of said shank having a longitudinal recess, said recess being bounded by intersecting wall surfaces which, when viewed in section transverse to the shank axis, are substantially normal to each other, a leading cutting edge, and a non-cutting trailing edge circumferentially spaced therefrom, said edges being defined by the intersection of said recess with said conical surface, said recess being so located with respect to the shank periphery as to present said conical surface as a surface of relief extending circumferentially from said cutting edge to said trailing edge.

References Cited by the Examiner

UNITED STATES PATENTS

| 2,479,730 | 8/1949 | Dewar | 85—47 |
| 2,856,680 | 10/1958 | Johnson et al. | |
| 3,044,341 | 7/1962 | Stern | 85—47 |

FOREIGN PATENTS

| 691,793 | 5/1953 | Great Britain. |
| 772,810 | 4/1957 | Great Britain. |
| 50,995 | 1/1910 | Switzerland. |

CARL W. TOMLIN, *Primary Examiner.*

M. PARSONS, JR., *Assistant Examiner.*